(12) United States Patent
Albert

(10) Patent No.: US 11,228,559 B2
(45) Date of Patent: *Jan. 18, 2022

(54) DOMAIN MANAGEMENT AND SYNCHRONIZATION SYSTEM

(71) Applicant: CALLFIRE, INC., Santa Monica, CA (US)

(72) Inventor: William Christopher Albert, Los Angeles, CA (US)

(73) Assignee: Callfire, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/926,253

(22) Filed: Jul. 10, 2020

(65) Prior Publication Data

US 2021/0185003 A1  Jun. 17, 2021

Related U.S. Application Data

(63) Continuation of application No. 16/710,537, filed on Dec. 11, 2019, now Pat. No. 10,715,484.

(51) Int. Cl.
*H04L 29/12* (2006.01)

(52) U.S. Cl.
CPC ...... *H04L 61/1552* (2013.01); *H04L 61/1511* (2013.01); *H04L 61/2007* (2013.01)

(58) Field of Classification Search
CPC ............. H04L 61/1552; H04L 61/1511; H04L 61/2007; H04L 67/1074; H04L 67/1087; H04L 67/1095; H04L 67/34; H04L 29/12066; H04L 61/3025; H04L 67/06; H04L 67/2852; H04L 2029/06054; H04L 29/12113; H04L 29/12132; H04L 29/12301; H04L 29/12811; H04L 41/082; H04L 41/12; H04L 43/00; H04L 43/0876; H04L 45/00; H04L 45/70; H04L 51/066; H04L 51/14; H04L 51/28; H04L 61/1541; H04L 61/2076; H04L 61/302; H04L 61/305; H04L 61/3055; H04L 61/307; H04L 61/6009; H04L 63/123; H04L 63/1408; H04L 63/1458; H04L 65/403; H04L 65/4084; H04L 65/602; H04L 67/02; H04L 67/1002; H04L 67/1008; H04L 67/101; H04L 67/1021; H04L 67/125; H04L 67/28; H04L 67/2814;
(Continued)

(56) References Cited

U.S. PATENT DOCUMENTS

| 6,769,031 | B1 | 7/2004 | Bero |
| 6,895,431 | B1 | 5/2005 | Bero |

(Continued)

*Primary Examiner* — Greg C Bengzon
(74) *Attorney, Agent, or Firm* — Knobbe, Martens, Olson & Bear, LLP

(57) ABSTRACT

A domain management system that manages domain names, network addresses, and other aspects of a computing network domain is provided. The domain management system obtains domain data, such as domain name system ("DNS") records, from any number of network-accessible providers of the domain data, such as DNS servers. The domain management system can store, transform, and synchronize the domain data among the network-accessible providers, even if the network-accessible providers do not all use or recognize the same format and/or content of domain data.

14 Claims, 6 Drawing Sheets

(58) Field of Classification Search
CPC ....... H04L 67/289; H04L 67/42; H04L 69/14; H04L 69/329; H04L 29/08; H04L 41/0246; H04L 41/50; H04L 43/0817; H04L 63/02; H04L 63/0815; H04L 63/10; H04L 63/20; H04L 67/16; H04L 67/26; G06F 16/2358; G06F 16/2365; G06F 16/2386; G06F 16/258; G06F 16/273; G06F 16/275; G06F 16/2291; G06F 16/955; G06F 3/04842; G06F 11/1446; G06F 13/00; G06F 16/182; G06F 16/2282; G06F 16/2379; G06F 16/245; G06F 16/252; G06F 2201/84; G06F 3/04847; G06F 40/14

See application file for complete search history.

(56) References Cited

U.S. PATENT DOCUMENTS

| | | | |
|---|---|---|---|
| 7,197,546 | B1 | 3/2007 | Bagga et al. |
| 7,251,826 | B1* | 7/2007 | Gardos .................. H04L 63/08 709/225 |
| 7,680,876 | B1 | 3/2010 | Cioli et al. |
| 8,312,125 | B1 | 11/2012 | Rioux et al. |
| 8,806,057 | B2 | 8/2014 | Mendell |
| 9,137,094 | B1* | 9/2015 | Sayed .................. H04L 61/1511 |
| 9,264,440 | B1 | 2/2016 | Stern |
| 9,300,623 | B1 | 3/2016 | Earl et al. |
| 9,367,560 | B1* | 6/2016 | Ely .......................... G06F 16/27 |
| 9,787,634 | B1* | 10/2017 | Lai ...................... H04L 61/3025 |
| 10,205,701 | B1 | 2/2019 | Voss et al. |
| 10,243,919 | B1* | 3/2019 | Suresh .................... H04L 67/16 |
| 10,430,847 | B2 | 10/2019 | Minardos et al. |
| 10,469,442 | B2 | 11/2019 | Mizik et al. |
| 10,521,453 | B1* | 12/2019 | Bush .................. H04L 61/1511 |
| 2002/0161745 | A1* | 10/2002 | Call ....................... H04L 61/157 |
| 2004/0015584 | A1* | 1/2004 | Cartmell ........... H04L 29/12009 709/225 |
| 2004/0044791 | A1* | 3/2004 | Pouzzner ................. G06F 40/12 709/245 |
| 2004/0194102 | A1 | 9/2004 | Nerdaels |
| 2004/0249971 | A1 | 12/2004 | Klinker |
| 2005/0203875 | A1* | 9/2005 | Mohammed .......... H04L 61/302 |
| 2006/0101113 | A1 | 5/2006 | Lemson et al. |
| 2006/0112176 | A1 | 5/2006 | Liu et al. |
| 2007/0165625 | A1* | 7/2007 | Eisner .................. G06Q 20/223 370/389 |
| 2007/0226269 | A1* | 9/2007 | Anna .................... G06F 16/182 |
| 2008/0016233 | A1 | 1/2008 | Schneider |
| 2008/0098084 | A1 | 4/2008 | Volz et al. |
| 2009/0164665 | A1 | 6/2009 | Foote et al. |
| 2010/0017368 | A1 | 1/2010 | Mao et al. |
| 2010/0274870 | A1* | 10/2010 | Cremin ............... H04L 67/2823 709/217 |
| 2011/0060950 | A1 | 3/2011 | Waldron et al. |
| 2011/0106924 | A1* | 5/2011 | Colosi ............... H04L 61/3025 709/222 |
| 2012/0158969 | A1* | 6/2012 | Dempsky ........... H04L 61/6013 709/226 |
| 2012/0278626 | A1 | 11/2012 | Smith et al. |
| 2012/0324113 | A1 | 12/2012 | Prince et al. |
| 2013/0151664 | A1 | 6/2013 | Miyao |
| 2013/0159547 | A1 | 6/2013 | Miyao |
| 2013/0173497 | A1 | 6/2013 | Gould et al. |
| 2013/0205035 | A1* | 8/2013 | Chen .................. H04L 61/1511 709/230 |
| 2013/0254328 | A1* | 9/2013 | Inoue ..................... H04L 67/16 709/217 |
| 2013/0254847 | A1* | 9/2013 | Adams ................ G06F 21/6218 726/4 |
| 2013/0268616 | A1 | 10/2013 | Sakata et al. |
| 2013/0290545 | A1* | 10/2013 | Lohner ............... H04L 61/3065 709/226 |
| 2014/0006641 | A1* | 1/2014 | James ................ H04L 61/2076 709/245 |
| 2014/0149552 | A1* | 5/2014 | Carney .................. H04L 67/32 709/219 |
| 2014/0188872 | A1 | 7/2014 | Bushlack et al. |
| 2014/0189489 | A1 | 7/2014 | Bushlack et al. |
| 2015/0067114 | A1* | 3/2015 | Ruggeri ............. H04L 61/1511 709/221 |
| 2015/0081440 | A1 | 3/2015 | Blemaster |
| 2015/0120893 | A1 | 4/2015 | Sapaliga et al. |
| 2015/0134832 | A1* | 5/2015 | Gould ................ H04L 61/1511 709/226 |
| 2015/0295882 | A1 | 10/2015 | Kaliski, Jr. |
| 2015/0381561 | A1* | 12/2015 | Meltzer ................ H04L 61/307 709/206 |
| 2016/0021055 | A1* | 1/2016 | Krzywonos ........... H04L 61/301 709/245 |
| 2016/0036816 | A1 | 2/2016 | Srinivasan |
| 2016/0050178 | A1* | 2/2016 | Frydman ............. H04L 61/1552 709/219 |
| 2016/0055490 | A1 | 2/2016 | Keren et al. |
| 2016/0057243 | A1 | 2/2016 | Gupta et al. |
| 2016/0179629 | A1 | 6/2016 | Gupta et al. |
| 2016/0179822 | A1 | 6/2016 | Gupta et al. |
| 2016/0182441 | A1 | 6/2016 | Gupta et al. |
| 2016/0182562 | A1 | 6/2016 | Gupta et al. |
| 2016/0241509 | A1 | 8/2016 | Akcin |
| 2016/0308819 | A1 | 10/2016 | Gupta |
| 2017/0012930 | A1 | 1/2017 | Akcin et al. |
| 2017/0041292 | A1 | 2/2017 | Stern |
| 2017/0063986 | A1* | 3/2017 | Gopal ................. H04L 67/1095 |
| 2017/0068530 | A1* | 3/2017 | Berrange ............. H04L 63/126 |
| 2017/0163754 | A1 | 6/2017 | Johnson |
| 2017/0171146 | A1* | 6/2017 | Sharma ............... H04L 67/2804 |
| 2017/0192951 | A1 | 7/2017 | Kollur et al. |
| 2017/0193467 | A1 | 7/2017 | Blinn et al. |
| 2017/0195249 | A1 | 7/2017 | Blinn |
| 2017/0201417 | A1* | 7/2017 | Gupta ................. H04L 61/1511 |
| 2018/0063141 | A1 | 3/2018 | Kaliski, Jr. et al. |
| 2018/0097831 | A1 | 4/2018 | Uppal et al. |
| 2018/0287997 | A1 | 10/2018 | Li et al. |
| 2018/0375716 | A1 | 12/2018 | Hacque et al. |
| 2019/0149506 | A1 | 5/2019 | Heller et al. |
| 2019/0364011 | A1 | 11/2019 | Nguyen et al. |
| 2019/0379660 | A1 | 12/2019 | Thirumavalaven |
| 2020/0137138 | A1* | 4/2020 | Rice .................. H04L 61/1511 |
| 2020/0162433 | A1* | 5/2020 | Subbarayan ............ H04L 45/58 |

\* cited by examiner

DOMAIN MANAGEMENT AND SYNCHRONIZATION SYSTEM

CROSS-REFERENCE TO RELATED APPLICATIONS

The present application is a continuation of U.S. patent application Ser. No. 16/710,537, filed on Dec. 11, 2019 and entitled "DOMAIN MANAGEMENT AND SYNCHRONIZATION SYSTEM," the contents of which are incorporated by reference herein.

BACKGROUND

Electronic devices may be used to exchange information over communication networks, such as the internet. For example, computing devices may use network addresses, such as internet protocol ("IP") addresses, to send communications to each other. When one computing device sends a communication to another computing device, the sending device addresses the communication to the network address of the receiving device. The communication is then sent via a communication network to the receiving device. Intermediary components of the communication network infrastructure (e.g., routers, switches, and the like) use the network address of the receiving device to route the communication to the receiving device.

In some cases, one computing device may be instructed to communicate with another computing device without first being provided the network address of the receiving device. For example, a sending device may be provided with a name of the receiving device, such as a domain name. In such cases, the sending device may determine the network address of the receiving device by requesting the network address from a domain name system ("DNS") name server. The DNS name server may respond to the request by providing the network address that is associated with the domain name. The sending device may then send the communication to the receiving device using the network address obtained from the DNS name server.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Figure 1:
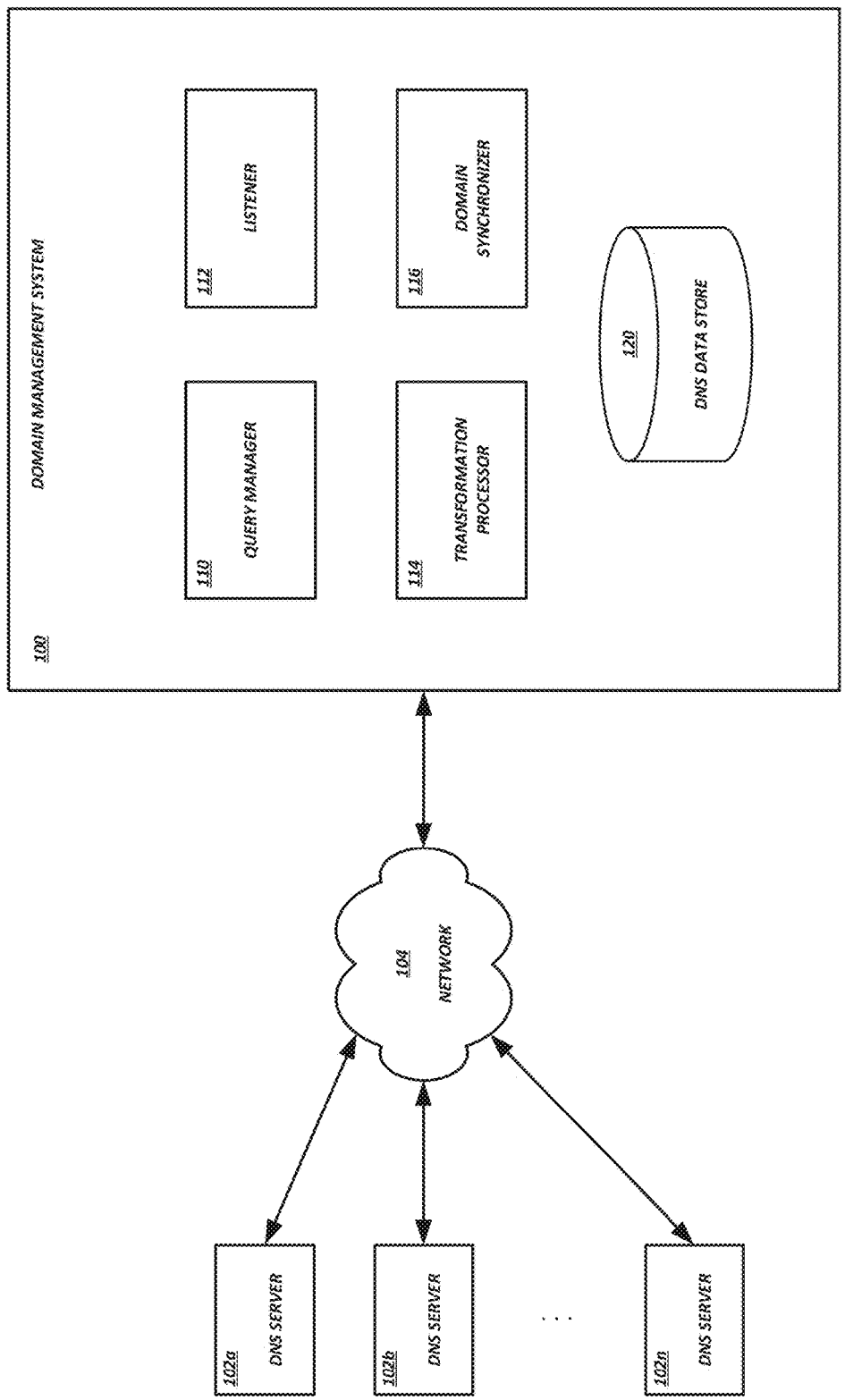
FIG. 1 is a block diagram of an illustrative network environment including a domain management system and various DNS servers according to some embodiments.

The present disclosure is directed to a domain management system that manages domain names, network addresses, and other aspects of a computing network domain. The domain management system obtains domain data, such as domain name system ("DNS") records, from any number of network-accessible providers of the domain data, such as DNS name servers. The domain management system can store, transform, and synchronize the domain data among the network-accessible providers, even if the network-accessible providers do not all use or recognize the same format and/or content of domain data.

A computing network domain—also referred to herein as a "domain" for convenience—may be associated with any number of sub-domains (e.g., sub-domain-1.example.com, sub-domain-2.example.com, etc.), any of which may be associated with its own sub-domains, and any or all of which may be associated with different network addresses. In addition, a domain may provide different computing services, including content hosting, email, file access via different protocols, and the like. Any or all of these services may be associated with a different network address and/or a different type of DNS record. Thus, a single domain may encompass dozens, hundreds, or more individual network addresses and/or DNS records.

Domains use the services of network-accessible DNS name servers—also referred to simply as DNS servers for convenience—to manage domain data for the domains. For example, a particular domain such as "example.com" may have a particular DNS server designated as the authoritative DNS server for network address data for the domain. User-friendly names and descriptors, such as those in a uniform resource locator ("URL") or other uniform resource identifier ("URI"), may then be used in lieu of specific network addresses, such as internet protocol ("IP") addresses, to access individual resources of the domain. A URL for the "index.html" resource of the "example.com" domain may include the domain name concatenated with the name of the resource: "example.com/index.html." To resolve the domain name into a network address of the system from which the resource can be accessed, a requesting computing device may be directed to contact the authoritative DNS server for the domain, directly or indirectly (e.g., through a series of recursive DNS lookup operations to various DNS servers such as a root name server, top-level-domain name server, etc.). The computing device may submit a query for the network address assigned to the domain. The authoritative DNS server responds to the query by providing a network address (e.g., IP address) to which the domain has been assigned. The requesting device may then access the resource using the resolved network address. Without being able to resolve domain names into network addresses from which resources can be accessed, consumers of services provided by the domain may not be able to access the services.

One technique for a DNS server to maximize uptime and meet service level agreements of the domains that it services is to implement redundancy within the DNS server. However, a single DNS server exclusively managing all domain data for a particular domain still represents a single point of failure from the perspective of entities external to the DNS server. Thus, it is desirable to use multiple independent DNS servers to manage domain data for a domain. This is advisable even though only one of the DNS servers is designated as authoritative for a particular domain, because the additional DNS servers can provide an additional layer of redundancy. However, different DNS servers may support different DNS record types, use different formats for storing DNS records, and may implement other DNS features differently. Moreover, different DNS servers are not configured to synchronize domain data with other DNS servers. Thus, the task of maintaining domain data across multiple DNS servers is unnecessarily inefficient and/or impractical.

Some aspects of the present disclosure relate to addressing the issues described above, among others, by converting domain data between different formats for different DNS servers. A domain management system can obtain domain data from a particular DNS server in a format that is specific to that DNS server. The domain management system can apply one or more transformations to the domain data to generate DNS server-independent domain data. Illustratively, the transformations may include re-formatting the data, augmenting the domain data with additional data from another source, de-duplicating or otherwise removing data, generating additional and/or alternative DNS record types, and the like. The domain management system can then update any number of other DNS servers with the data so that multiple DNS servers are synchronized with up-to-date domain data. In order to update other DNS servers, the domain management system may transform the DNS server-independent data into a format that is specific to each DNS server that is to be updated. The transformations may include re-formatting the data, augmenting the domain data with additional data from another source, de-duplicating or otherwise removing data, generating additional and/or alternative DNS record types, and the like. In this way, the domain management system can manage the domain data stored among multiple independent DNS servers regardless of whether the DNS servers use or recognize the same format and/or content of domain data.

Additional aspects of the present disclosure relate to monitoring DNS servers for changes to domain data, and synchronizing the changes among other DNS servers. The domain management system can subscribe to notifications regarding changes in domain data at individual DNS servers, poll the DNS servers to determine whether domain data has been changed, or obtain information about changes to domain data in some other manner. When a change to domain data is detected, the domain management system can obtain a snapshot of all domain data at the DNS server, or some subset thereof such as the DNS records that have been changed. The domain management system may apply one or more sets of transformations to the domain data to generate DNS server-independent data and/or domain data that can be sent to other DNS servers to ensure data parity between all of the DNS servers—or some subset thereof—managing domain data for the domain. In this way, the domain management system can automatically synchronize domain data among multiple independent DNS servers in response to domain data changing at one of the DNS servers.

Various aspects of the disclosure will now be described with regard to certain examples and embodiments, which are intended to illustrate but not limit the disclosure. Although aspects of some embodiments described in the disclosure will focus, for the purpose of illustration, on particular examples of domain data records, transformations, and the like, the examples are illustrative only and are not intended to be limiting. In some embodiments, the techniques described herein may be applied to additional or alternative domain data records, transformations, etc.

Network Environment

With reference to an illustrative embodiment, FIG. 1 shows a network environment in which aspects of the present disclosure may be implemented. As shown, the network environment may include a domain management system 100 and various DNS servers 102a, 102b, . . . 102n. The DNS servers 102a, 102b, . . . 102n may be referred to collectively as DNS servers 102 for convenience.

The domain management system 100 and the various DNS servers 102 may communicate with each other via one or more communication networks 104. Illustratively, a communication network 104 may be a publicly-accessible network of linked networks, possibly operated by various distinct parties, such as the Internet. In some cases, the network 104 may include a private network, personal area network, local area network, wide area network, cable network, satellite network, cellular data network, etc., or a combination thereof, some or all of which may or may not have access to and/or from the Internet.

The domain management system 100 may include various components for providing the features described herein. Illustratively, the domain management system 100 may include a query manager 110 for retrieving domain data from DNS servers 102. The domain management system 100 may also include a listener 112 to monitor DNS servers 102 for changes to domain data stored at the DNS servers 102. The domain management system 100 may also include a transformation processor 114 for determining and applying sets of transformations to server-specific domain data to generate server-independent domain data, and vice versa. The domain management system 100 may also include a domain synchronizer 116 for determining the domain data to be sent to one or more DNS servers 102 to ensure that that the domain data maintained by all DNS servers 102 for the domain remains synchronized. The domain management system 100 may also include various data stores for storing data and otherwise supporting the operation of components of the domain management system 100. For example, the domain management system 100 may include a DNS data store 120 to store server-independent domain data, information about server-specific domain data formats and requirements, and the like. The example components and data stores of the domain management system 100 shown in FIG. 1 are illustrative only, and are not intended to be limiting. In some embodiments, a domain management system 100 may have fewer, additional, and/or alternative components and data stores.

The domain management system 100 may be implemented on one or more physical server computing devices. In some embodiments, the domain management system 100 (or individual components thereof, such as the query manager 110, listener 112, transformation processor 114, domain synchronizer 116, etc.) may be implemented on one or more host devices, such as blade servers, midrange computing devices, mainframe computers, desktop computers, or any other computing device configured to provide computing services and resources. For example, a single host device may execute one or more query managers 110, listeners 112, transformation processors 114, domain synchronizers 116, some combination thereof, etc. The domain management system 100 may include any number of such hosts.

In some embodiments, the features and services provided by the domain management system 100 may be implemented as web services consumable via one or more communication networks. In further embodiments, the domain management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The DNS servers 102 may maintain domain data for any number of domains, respond to DNS queries to resolve domain and subdomain names into network address, and the like. Illustratively, the domain data may be maintained as a set of DNS records for each domain, subdomain, etc. associated with a given DNS server 102. In some embodiments, DNS servers 102 may be implemented on one or more host devices, such as blade servers, midrange computing devices, mainframe computers, desktop computers, or any other computing device configured to provide computing services and resources. In some embodiments, the features and services provided by one or more of the DNS servers 102 may be implemented as web services consumable via one or more communication networks, and/or provided by a cloud computing environment.

Example Domain Data Acquisition Process

Figure 2:
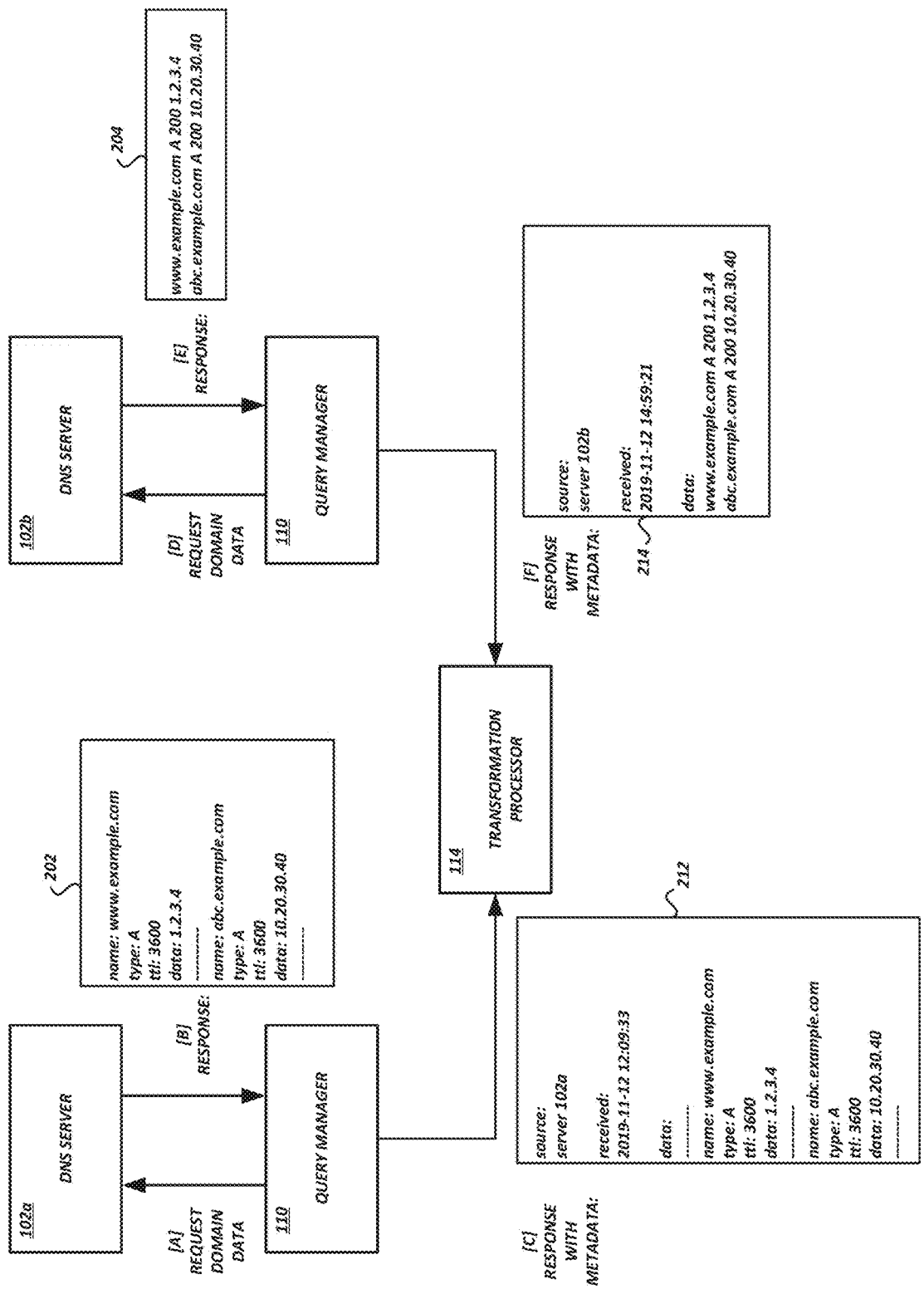
FIG. 2 is a block diagram of various data flows and interactions between the domain management system and various DNS servers to obtain domain data according to some embodiments.

FIG. 2 shows example data flows and interactions between the domain management system 100 and various DNS servers 102a and 102b during acquisition of domain data. The domain management system 100 may acquire domain data from a DNS server in order to keep a backup of the domain data, migrate the domain data to a different DNS server, synchronize changes detected by the listener 112 (as described in greater detail below), or in response to some other event or command.

At [A], the query manager 110 can request domain data from DNS server 102a. The query manager 110 may request domain data associated with a particular portion of the total DNS name space. The particular portion of the total DNS namespace may also be referred to as a zone. For example, the domain management system 100 may manage the domain data for the zone "example.com," and the query manager 110 may request domain data for the "example.com" zone from DNS server 102a. The query manager 110 may request all of the relevant domain data, or some subset thereof. Illustratively, the request may include one or more parameters. The parameters may include: a name, descriptor, or identifier for the requested zone; selection or filtering criteria (e.g., dates or date ranges for created, updated, or deprecated DNS records); security credentials (e.g., account identifier, security token, etc.); other data; or some combination thereof.

The request may in some cases be an application programming interface ("API") request to the DNS server 102a. For example, the request may be a REpresentational State Transfer ("REST") call. In some embodiments, the request may be a request for a user interface, such as a markup language-based interface (e.g., a hypertext markup language or "HTML" interface). The query manager 110 may then parse the markup language-based response to obtain the desired data (e.g., perform a "scraping" procedure whereby the markup language is parsed to identify fields, and data within the fields, that is relevant to the DNS records).

At [B], the query manager 110 may receive a response 202 to the request sent at [A]. The response 202 may include a listing of all domain data that DNS server 102a has for the zone that served as the basis for the request, or a subset thereof that satisfies the parameters of the request. The domain data may be in the form of one or more DNS records that are responsive to the query. The DNS records may be provided in a data structure that is formatted according to a particular framework, such as JavaScript Object Notation ("JSON"), eXtensible Markup Language ("XML"), comma separated values ("CSV"), or some other structured data format. In some cases, the DNS records may be provided according to a format that is unique to DNS server 102a, or using a particular structure that is unique to DNS server 102a even if the formatting of the records conforms to a standard such as JSON or XML.

The DNS records may each include any number of individual data fields. For example, a DNS "A" record is used to map a network resource such as a domain name or subdomain name (also referred to as a "host" name) to an IP address for a period of time (also referred to as "time to live" or "TTL"). Thus, an A record will typically have a data field for the host name, a data field for the IP address, and a data field for the TTL. As another example, a DNS "CNAME" record maps one host name known as an alias, to another host name known as a canonical name, for a period of time. Thus, a CNAME record will typically have a data field for the alias name, a data field for the canonical name, and a data field for the TTL. Other types of DNS records include PTR records for reverse-lookup of host names mapped to given IP addresses, MX records for mail routing, and TXT records for storing text-based information. The example DNS records described in the present disclosure are illustrative only, and are not intended to be limiting.

In the example illustrated in FIG. 2, the response 202 from the DNS server 102a provides two A records using a first server-specific format. As shown, the records are separated by hyphens, and individual data fields are separated onto different lines prefixed with the name of the data field.

At [C], the query manager 110 may provide the DNS records received at [B] to the transformation processor 114. As described in greater detail below, the transformation processor 114 can apply a set of transformations to the DNS records so that they may be stored in a server-independent format. The query manager 110 may provide the DNS records as-received from the DNS server 102a. In some embodiments, the query manager 110 may augment the DNS records or perform some other preliminary processing before providing the DNS records to the transformation processor 114. For example, the query manager 110 may provide an augmented data set 212 that includes the DNS records received from DNS server 102a, and also includes data indicating the source of the DNS records (DNS server 102a in this example), the date and time that the records were received, etc.

At [D], the query manager 110 may request domain data from a different DNS server: DNS server 102b. For example, DNS server 102b may provide redundancy to server 102a. In this implementation, DNS server 102a may be the authoritative server, and DNS server 102b may serve as a backup for situations when DNS server 102A is offline or otherwise unable to respond to DNS queries. The query manager 110 may request domain data associated with the same zone as requested from the DNS server 102a. The request may be made to compare the data with the data received from DNS server 102a, compare differences, synchronize data among the DNS servers, perform a backup of all domain data, or for some other reason.

At [E], the query manager 110 may receive a response 204 from DNS server 102b to the request sent at [D]. The response 204 may include a listing of all domain data that the DNS server 102b has for the zone that served as the basis for the request, or a subset thereof that satisfies the parameters of the request. The domain data may be in the form of one or more DNS records that are responsive to the query. As described above, different DNS servers may provide DNS records in different formats or structures.

In the example illustrated in FIG. 2, DNS server 102b has provided two A records using a second server-specific format that is different than the first server-specific format by which DNS server 102a provided the same two A records. As shown, the records are provided with each record being on its own line, and the individual data fields delimited by whitespace such as a tab or space. In this format, the order of the data fields within each record would need to be known to the receiver in order to parse the records.

At [F], the query manager 110 may provide the DNS records received at [E] to the transformation processor 114. As described in greater detail below, the transformation processor 114 can apply a set of transformations to the DNS records so that they may be stored in a server-independent format. The query manager 110 may provide the DNS records as-received from the DNS server 102b. In some embodiments, the query manager 110 may augment the DNS records or perform some other preliminary processing before providing the DNS records to the transformation processor 114. For example, the query manager 110 may provide an augmented data set 214 that includes DNS records received from DNS server 102b, and also includes data indicating the source of the DNS records (DNS server 102b in this example), the date and time that the records were received, etc.

Example Domain Data Monitoring Process

Figure 3:
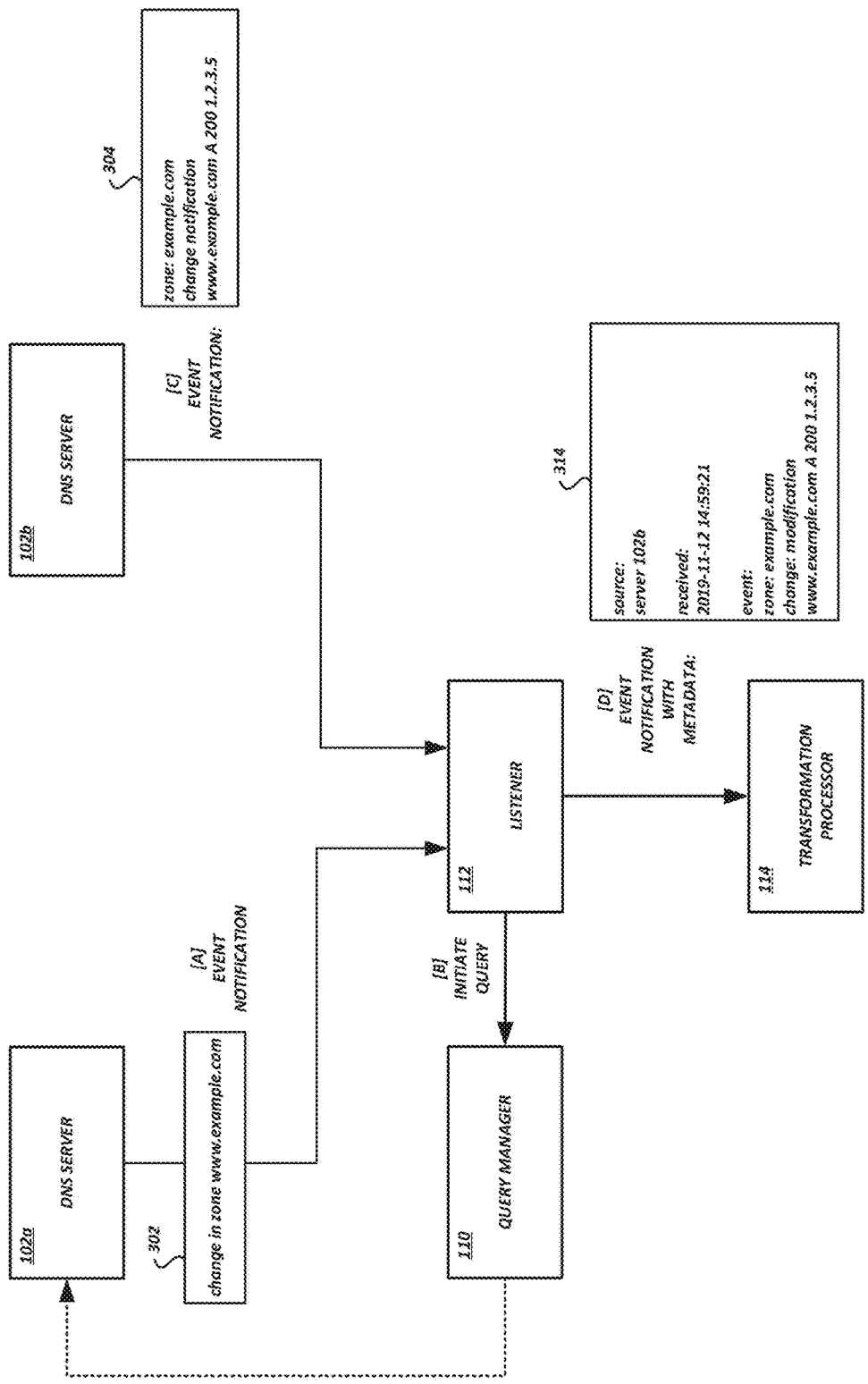
FIG. 3 is a block diagram of various data flows and interactions between the domain management system and various DNS servers to determine that domain data has changed according to some embodiments.

FIG. 3 shows example data flows and interactions between the domain management system 100 and various DNS servers 102a and 102b during monitoring of the domain data maintained by the DNS servers 102a, 102b. The domain management system 100 may monitor the domain data maintained by the DNS servers 102a, 102b—actively or passively—to determine when a change has occurred to the domain data. Advantageously, the domain management system 100 can automatically initiate an update process to synchronize domain data across DNS servers once a change has been detected.

At [A], the listener 112 can receive a notification 302 from DNS server 102a regarding a change to domain data maintained by the DNS server 102a. The domain management system 100 may subscribe to notifications from DNS server 102a, and the subscribed notifications may be received whenever domain data associated with a particular zone, or otherwise satisfying particular criteria, is changed. For example, the domain management system 100 may register with DNS server 102a to be notified whenever a change occurs to a DNS record associated with a particular zone. The listener 112 may be configured to provide a callback function, monitor a message queue, or implement some other process for determining when domain data for a zone has been changed. When such a change occurs, DNS server 102a may call the callback function, generate a message, or otherwise initiate a process by which the listener 112 may be notified.

The notification 302 from DNS server 102a may indicate that a change to domain data for the zone has occurred, but the notification may not include the DNS record or records that have been changed, or may not include data sufficient to determine the specific change that has been made. For example, the notification may include an identifier of a DNS record that has been changed, or the notification may merely indicate that data associated with a particular zone has been changed. In some embodiments, the notification may include a field or other indicator that specifies the change that has been made. For example, the notification may specify that a particular DNS record or set of records has been added, deleted or changed.

At [B], the listener 112 can process the notification 302 received at [A] and initiate a query for domain data associated with the zone. The listener 112 can determine that the notification 302 indicates domain data for the zone, to be managed by the domain management system 100, has changed, and the listener 112 can instruct or otherwise cause the query manager 110 to obtain domain data for the zone, as described in greater detail above.

At [C], the listener 112 can receive a notification 304 from a different DNS server—DNS server 102b—regarding a change to domain data maintained by DNS server 102b. The domain management system 100 may subscribe to notifications from DNS server 102b, and the notifications may be received whenever domain data associated with a particular zone, or otherwise satisfying particular criteria, is changed. For example, as described above with respect to DNS server 102a, the domain management system 100 may register with the DNS server 102b to be notified whenever a change occurs to a DNS record associated with a particular zone.

The notification 304 from DNS server 102b may indicate that a change to domain data for the zone has occurred, and may include the changed DNS record(s) or data from which the changes can be derived. For example, as shown, the notification 304 may include a complete DNS record, including a change that has been made. In this example, the change may be a new IP address, in the "data" field, when compared to a DNS record previously received from DNS server 102b. The DNS record may be formatted according to a server-specific format of the DNS server 102b. In some embodiments, the notification may include a field or other indicator that specifies the change that has been made. For example, the notification may specify that the DNS record included in the notification is a new record that has been added to the DNS server 102b or a record that has been deleted or otherwise deactivated from the DNS server 102b. As another example the notification may specify the particular field or set of fields whose data values have changed (or been added to or removed from the DNS record).

At [D], the listener 112 can provide the notification(s) received at [C] to the transformation processor 114. As described in greater detail below, the transformation processor 114 can apply a set of transformations to the DNS records so that they may be stored in a server-independent format. The listener 112 may provide the DNS records as-received from the DNS server 102b. In some embodiments, the listener 112 may augment the DNS records or perform some other preliminary processing before providing the DNS records to the transformation processor 114. For example, the listener 112 may provide an augmented data set 314 that includes DNS records received from DNS server 102b, and also includes data indicating the source of the DNS records (DNS server 102b in this example), the date and time that the records were received, etc.

Example DNS Record Transformation and Synchronization Process

Figure 4:
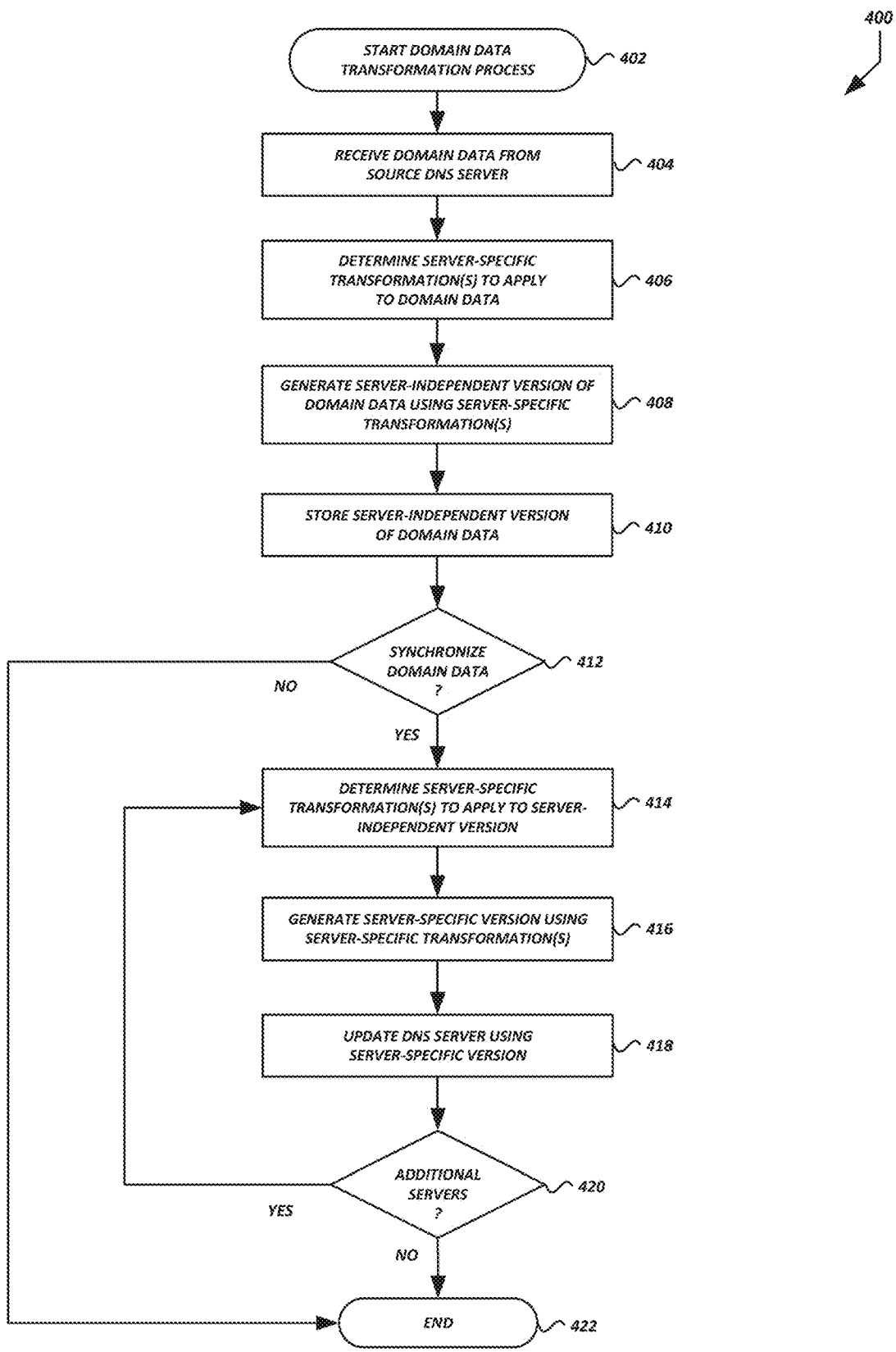
FIG. 4 is a flow diagram of an illustrative process for managing domain data according to some embodiments.

FIG. 4 is a flow diagram of an illustrative process 400 that may be executed by a domain management system 100 to transform domain data from a server-specific format associated with a particular DNS server into a server-independent format for storage. The domain management system 100 may then use the server-independent domain data for synchronization of domain data across one or more DNS servers by transforming the server-independent domain data into the server-specific format(s) of the target DNS server(s). Advantageously, the process 400 may be performed to synchronize domain data across multiple DNS servers—each using different and potentially incompatible formats and modification operations—automatically in response to determining that domain data at one DNS server has changed. Portions of the process 400 will be described with reference to the diagram of illustrative data flows and interactions shown in FIG. 5.

The process 400 shown in FIG. 4 begins at block 402. The process 400 may begin in response to an event, such as when the domain management system 100 begins operation, is notified of a change to domain data at a DNS server, or in response to some other event. When the process 400 is initiated, a set of executable program instructions stored on one or more non-transitory computer-readable media (e.g., hard drive, flash memory, removable media, etc.) may be loaded into memory (e.g., random access memory or "RAM") of a computing device of the domain management system 100. The executable instructions may then be executed by a hardware-based computer processor (e.g., a central processing unit or "CPU") of the computing device. In some embodiments, the process 400 or portions thereof may be implemented on multiple processors, serially or in parallel.

At block 404, the transformation processor 114 may receive domain data that originated from a source DNS server. The domain data may have been obtained by the domain management system 100 as part of a proactive query (e.g., initiated by the query manager 110 to obtain domain data for analysis and/or backup), as part of an automatically-generated change notification (e.g., received by the listener 112), or in response to some other event. In some embodiments, the query manager 110 or listener 112 may have modified the domain data in some manner prior to providing it to the transformation processor 114. For example, the domain data 500 may include an identifier of the source DNS server 102, a time stamp indicating when the domain data was obtained, etc. Examples of obtaining domain data from a DNS server 102 in a server-specific format associated with the DNS server 102 are described in greater detail above.

At block 406, the transformation processor 114 may analyze the domain data 500 to determine the transformation(s) to apply to the domain data 500 in order to generate server-independent domain data. The transformation processor 114 may determine the DNS server from which the domain data 500 was received, or otherwise determine the server-specific format of the domain data. For example, the query manager 110 may have included a source identifier in the domain data 500, specifying that the domain data 500 came from a particular DNS server, such as DNS server 102a illustrated in FIG. 3. The transformation process 114 may identify a set of one or more transformation rules 510 for transforming domain data 500 in a particular server-specific format into a server-independent format. The transformation rules 510 identified by the transformation processor 114 may be a subset of the transformation rules to which the transformation processor 114 has access to transform domain data in any number of server-specific formats into the server-independent format.

At block 408, the transformation processor 114 may generate a server-independent version 502 of the domain data 500 using the transformation rules 510 identified above. The transformations may include re-formatting the domain data, augmenting the domain data with additional data from another source, modifying the domain data, de-duplicating the domain data, other transformations, or some combination thereof. Several example transformations will be described herein for illustrative purposes only. The examples are not required in all embodiments, and are not meant to be exhaustive of all possible transformations specified by the transformation rules 510 or otherwise applied by the transformation processor 114.

As a first example, the transformation processor 114 may augment domain data with additional data that is obtained from sources other than the source DNS server 102a, or additional data that is generated by the transformation processor 114. In some embodiments, the source DNS server 102a may not support a particular type of DNS record. When the transformation processor 114 generates a server-independent version of the domain data, the transformation processor 114 may generate a DNS record of the type not supported by the DNS server 102. For example, the source DNS server 102a may not support PTR records for reverse-lookup of host names mapped to given IP addresses. The DNS server 102a may use a transformation rule 510 to generate PTR records for the host names in the domain data 500. The information required for the PTR records may come from other DNS records in the domain data (e.g., A DNS records), information in the DNS data store 120, or the like.

As a second example, the transformation processor 114 may modify domain data obtained from a source DNS server to generate server-independent data. In some embodiments, when the transformation processor 114 processes a particular type of DNS record, the transformation processor 114 may convert the DNS record into a different type of DNS record. For example, the DNS server 102a may not support a sender policy framework ("SPF") DNS record used for mail authentication. The information that would be in an SPF record may instead be in a TXT record. The transformation processor 114 may convert such a TXT record into an SPF record.

As a third example, the transformation processor 114 may modify the structure and/or formatting of the domain data 500 in general, or specific DNS records in particular, to generate server-independent domain data. In some embodiments, the server-independent format may be based on a formatting framework such as JSON or XML. Particular DNS records, with particular DNS fields, may be represented using the constructs of the formatting framework. The transformation processor 114 can extract the DNS records or individual portions thereof from the domain data 500, and generate domain data in the desired server-independent format. In some cases, even if the domain data 500 received in a server-specific format is formatted using the same formatting framework as the server-independent format uses, there may be translation, re-structuring, and other modifications needed to produce the server-independent format. For example, individual records may be structured differently, individual fields may have different names and/or attributes, etc. The transformation processor 114 may use the rules 510 to map and/or convert the domain data in the server-specific format to the domain data in the server-independent format.

Figure 5:
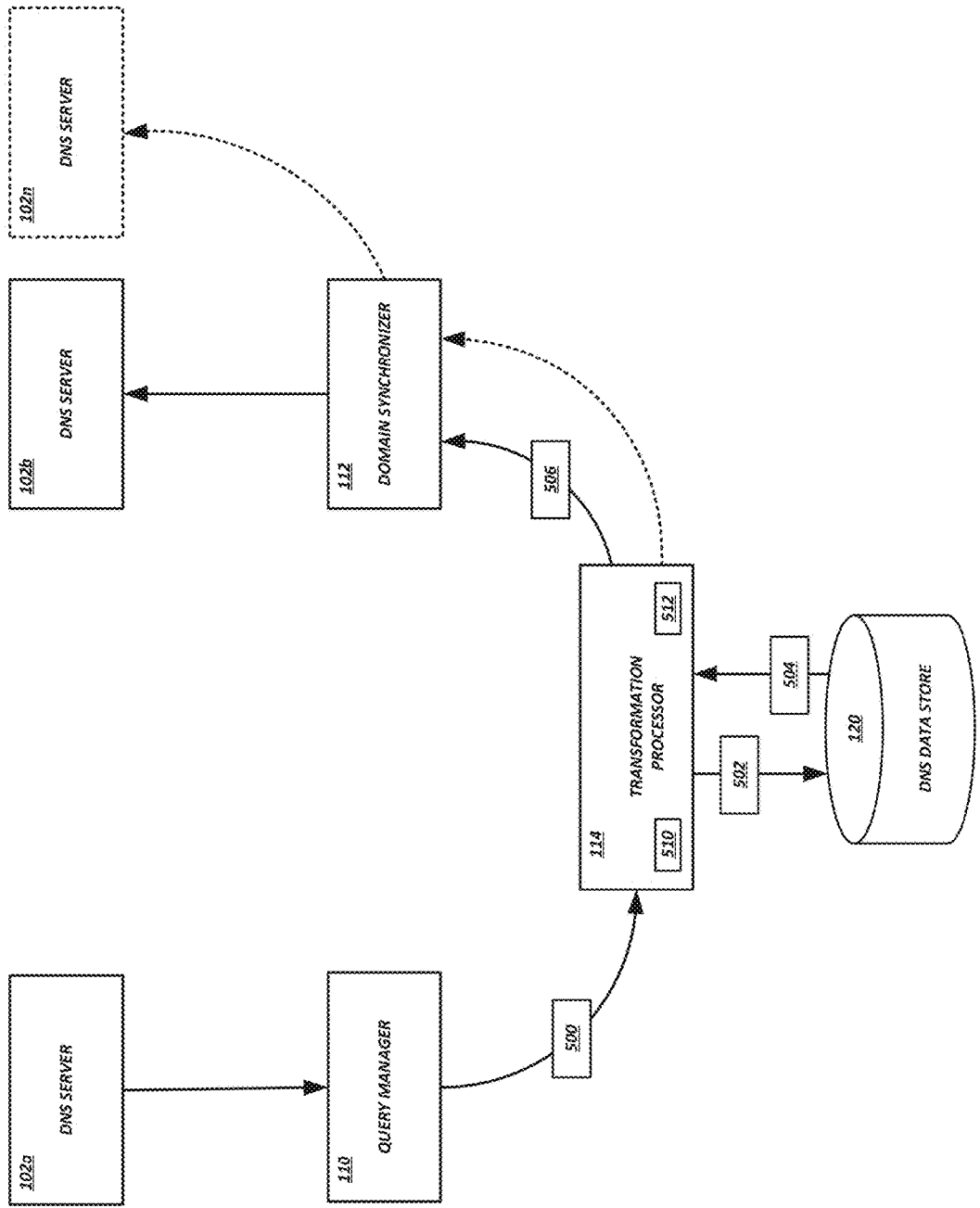
FIG. 5 is a block diagram of various data flows and interactions between the domain management system and various DNS servers to synchronize domain data according to some embodiments.

At block 410, the transformation processor 114 may store the transformed, server-independent version 502 of the domain data to the DNS data store 120, as shown in FIG. 5. Storing the server-independent version 502 of the domain data allows the domain management system 100 to maintain a single copy of domain data for a domain, from which any number of server-specific versions may be created.

In some embodiments, the transformation processor 114, DNS data store 120, or some other component of the domain management system 100 can de-duplicate the server-independent domain data maintained for a given domain. The transformation processor 114 may obtain domain data originating from a particular DNS server that includes a particular DNS record, and can apply de-duplication to the data. For example, the transformation processor 114 may obtain, from DNS server 102a, an A record for a specific host name. The DNS data store 120 may include a previously-stored A record for the same host name. The previously-stored record may have been obtained from the same DNS server 102a, or from a different DNS server 102b. The currently-processed record may replace the previously-stored record rather than being stored as a duplicate. In some cases, timestamp data may be associated with the previously-stored record, and the currently-processed record may only replace the previously-stored record if timestamp data for the currently-processed record indicates the currently-processed record is more recent than the previously-stored record.

In some embodiments, the transformation processor 114 may receive multiple sets of domain data to process within a given period of time. Individual sets may be received from different DNS servers, from the same DNS server, or some combination thereof. The transformation processor 114 may process the sets of domain data (e.g., execute the operations described with respect to blocks 406-410) according to a particular order to ensure that a proper sequence of changes is applied. For example, the sets of domain data may be processed in order according to the timestamps that are applied by the query manager 110 or listener 112.

At decision block 412, the domain management system 100 can determine whether to synchronize domain data for a domain across multiple DNS servers or to otherwise send domain data to one or more DNS servers. The determination may be made based on a change to domain data being saved to the DNS data store 120. For example, a secondary DNS server 102b may be used to provide redundancy to a primary DNS server 102a. If domain data has changed at the primary DNS server 102a, the changes may be synchronized to the secondary DNS server 102b. As another example, an administrator of the domain may wish to migrate domain data from one DNS server 102a to another DNS server 102b.

If the domain management system 100 is to synchronize domain data, the process 400 may proceed to block 414. Otherwise, the process 400 may terminate at block 422.

At block 414, the transformation processor 114 can determine the transformation(s) to apply to the server-independent domain data 502 stored in the domain data store in order to generate domain data in a server-specific format for sending to a DNS server identified above, such as DNS server 102b. The transformation process 114 may identify a set of one or more transformation rules 512 for transforming server-independent domain data 502 into server-specific domain data 506 formatted in a server-specific format. The transformation rules 512 identified by the transformation processor 114 may be a subset of the transformation rules to which the transformation processor 114 has access to transform server-independent format domain data into domain data in any number of server-specific formats.

At block 416, the transformation processor 114 can generate a server-specific version of the domain data 504 using the transformation rules 512 identified above. The transformations may include re-formatting the domain data, augmenting the domain data with additional data from another source, modifying the domain data, excluding certain domain data, other transformations, or some combination thereof. For example, some transformations may be an inverse of transformations described above for generating server-independent domain data from server-specific domain data.

At block 418, the domain synchronizer 116 can update the domain data stored at a destination DNS server, such as secondary DNS server 102b, using the server-specific domain data 506 generated by the transformation processor 114. The domain synchronizer 116 may provide an upload of the server-specific domain data 506 to be integrated with or replace the domain data currently managed by the secondary DNS server 102b, if any. In some embodiments, the domain synchronizer 116 may make API calls or perform other programmatic operations to update the domain data stored at the secondary DNS server 102b, instead of providing an upload of the serve-specific domain data 506. For example, the domain synchronizer 116 may establish a connection with the secondary DNS server 102b, provide authentication credentials, obtain authorization to modify domain data, and make one or more API calls to update domain data managed by the secondary DNS server 102b.

At decision block 420, the domain management system 100 may determine whether there are additional DNS servers to be synchronized or otherwise updated. If so, the process 400 can return to block 414 for each DNS server. In some embodiments, the synchronization of multiple DNS servers may occur in parallel or asynchronously, rather than serially as shown. If there are no DNS servers remaining to be updated, the process 400 may end at block 422.

Execution Environment

Figure 6:
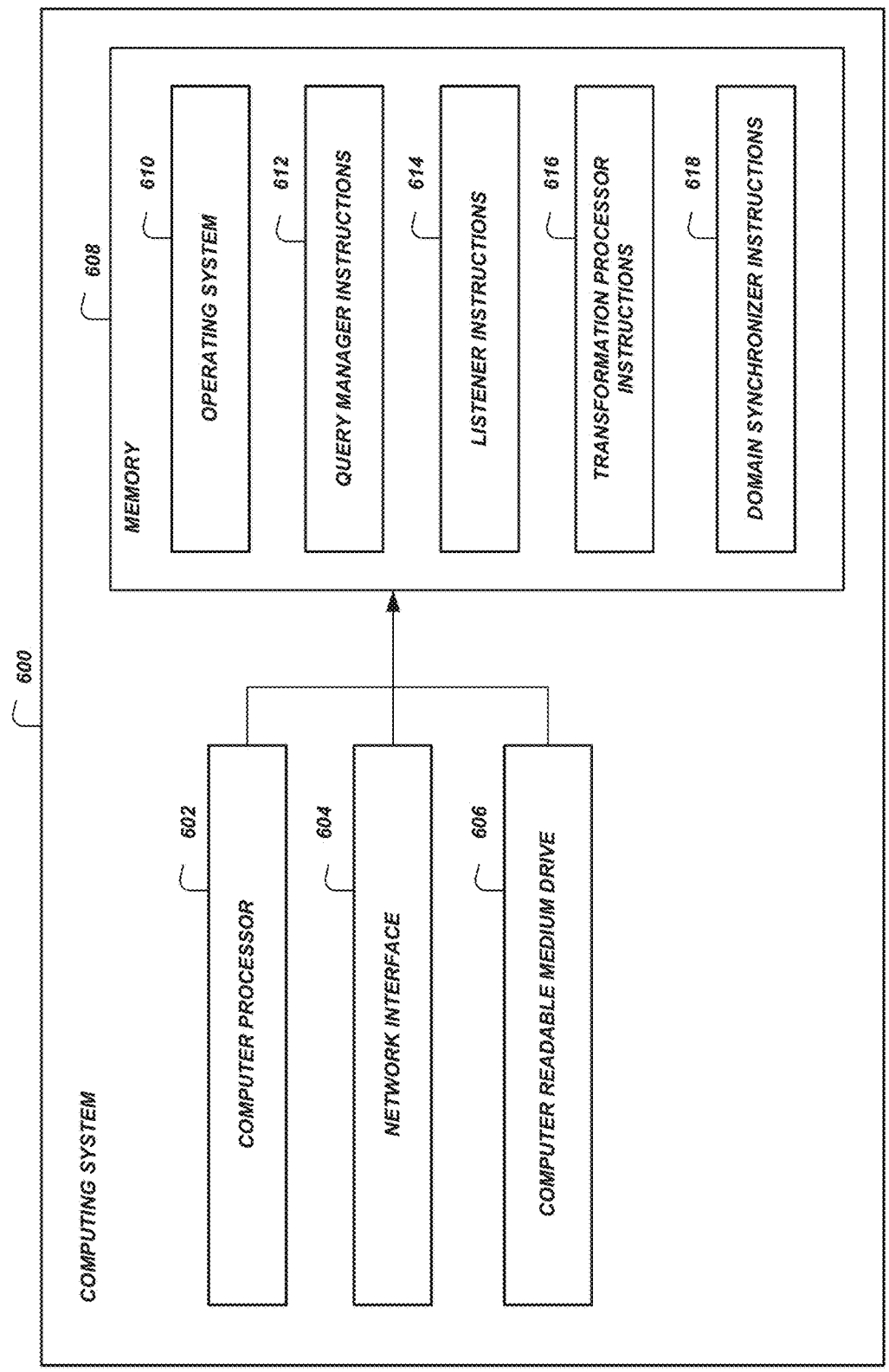
FIG. 6 is a block diagram of a computing system that may be used to implement the domain management system or portions thereof according to some embodiments.

FIG. 6 shows components of an illustrative computing system 600 that may be used to implement some or all of the features of the domain management system 100 described above. In some embodiments, as shown, the computing system 600 may include: one or more computer processors 602, such as physical central processing units ("CPUs"); one or more network interfaces 604, such as a network interface cards ("NICs"); one or more computer readable medium drives 606, such as a high density disk ("HDDs"), solid state drives ("SDDs"), flash drives, and/or other persistent non-transitory computer-readable media; and one or more computer readable memories 608, such as random access memory ("RAM") and/or other volatile non-transitory computer-readable media. The computer readable memory 608 may include computer program instructions that the computer processor 602 executes in order to implement one or more embodiments. For example, the computer readable memory 608 can store an operating system 610 that provides computer program instructions for use by the computer processor 602 in the general administration and operation of the computing system 600. The computer readable memory 608 may also include query manager instructions 612 for implementing the query manager 110. The computer readable memory 608 may also include listener instructions 614 for implementing the listener 112. The computer readable memory 608 may also include transformation processor instructions 616 for implementing the transformation processor 114. The computer readable memory 608 may also include domain synchronizer instructions 618 for implementing the domain synchronizer 116.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising executable instructions and one or more computer processors configured by the executable instructions to at least:
    subscribe to notifications from a first domain name system ("DNS") server;
    receive, from the first DNS server, a notification that a first DNS record for a domain has changed, wherein the first DNS record maps a resource associated with the domain to a network address of the resource, and wherein the notification is received based at least partly on subscribing to the notifications from the first DNS server;

retrieve, from the first DNS server, a first set of DNS records for the domain, wherein the first set of DNS records are retrieved in a first server-specific format associated with the first DNS server, and wherein the first set of DNS records comprises the first DNS record that has been changed;

determine a first transformation set associated with the first DNS server, wherein the first transformation set comprises one or more transformations to be applied to the first set of DNS records to generate a second set of DNS records in a DNS server-independent format;

generate the second set of DNS records in the DNS server-independent format using the first set of DNS records and the first transformation set, wherein a second DNS record in the DNS server-independent format is generated based at least partly on the first transformation set using a formatting alteration applied to a third DNS record in the first server-specific format;

determine, based at least partly on (1) an association of the domain with a second DNS server and (2) the notification from the first DNS server, to update domain-specific data at the second DNS server;

determine a second transformation set associated with the second DNS server, wherein the second transformation set comprises one or more transformations to be applied to the second set of DNS records to generate a third set of DNS records in a second server-specific format associated with the second DNS server;

generate the third set of DNS records using the second set of DNS records and the second transformation set; and update the domain-specific data at the second DNS server using the third set of DNS records.

2. The system of claim 1, wherein the one or more computer processors configured to generate the second set of DNS records are further configured to exclude a fourth DNS record of the first set of DNS records such that the second set of DNS records does not include any DNS record corresponding to the fourth DNS record.

3. The system of claim 1, wherein the one or more computer processors configured to generate the second set of DNS records are further configured to generate, based at least partly on the first transformation set, a record of the second set of DNS records using a combination of data from a record of the first set of DNS records and data from a data source separate from the first DNS server.

4. The system of claim 1, wherein the one or more computer processors configured to generate the second set of DNS records are further configured to generate, based at least partly on the first transformation set, a fourth DNS record of a first DNS record type using a fifth DNS record of a second DNS record type from the first set of DNS records.

5. The system of claim 1, wherein the one or more computer processors configured to retrieve the first set of DNS records from the first DNS server are further configured to parse a markup-language based user interface, received from the first DNS server, to derive the first set of DNS records.

6. A computer-implemented method comprising:
as implemented by a computing system comprising one or more computer processors configured to execute specific instructions,
subscribing to notifications from a first domain name system ("DNS") server;

receiving, from the first DNS server, a notification that a first DNS record for a domain has changed, wherein the first DNS record maps a resource associated with the domain to a network address of the resource, and wherein the notification is received based at least partly on subscribing to the notifications from the first DNS server;

retrieving, from the first DNS server, a first set of DNS records for the domain, wherein the first set of DNS records are retrieved in a first server-specific format associated with the first DNS server, and wherein the first set of DNS records comprises the first DNS record that has been changed;

determining a first transformation set associated with the first DNS server, wherein the first transformation set comprises one or more transformations to be applied to the first set of DNS records to generate a second set of DNS records in a DNS server-independent format;

generating the second set of DNS records in the DNS server-independent format using the first set of DNS records and the first transformation set, wherein a second DNS record in the DNS server-independent format is generated based at least partly on the first transformation set using a formatting alteration applied to a third DNS record in the first server-specific format;

determining, based at least partly on (1) an association of the domain with a second DNS server and (2) the notification from the first DNS server, to update domain-specific data at the second DNS server;

determining a second transformation set associated with the second DNS server, wherein the second transformation set comprises one or more transformations to be applied to the second set of DNS records to generate a third set of DNS records in a second server-specific format associated with the second DNS server;

generating the third set of DNS records using the second set of DNS records and the second transformation set; and updating the domain-specific data at the second DNS server using the third set of DNS records.

7. The computer-implemented method of claim 6, wherein generating the second set of DNS records comprises excluding a fourth DNS record of the first set of DNS records such that the second set of DNS records does not include any DNS record corresponding to the fourth DNS record.

8. The computer-implemented method of claim 6, wherein generating the second set of DNS records comprises generating, based at least partly on the first transformation set, a record of the second set of DNS records using a combination of data from a record of the first set of DNS records and data from a data source separate from the fourth DNS server.

9. The computer-implemented method of claim 6, wherein generating the second set of DNS records comprises generating, based at least partly on the first transformation set, a fourth DNS record of a first DNS record type using a fifth DNS record of a second DNS record type from the first set of DNS records.

10. The computer-implemented method of claim 6, further comprising parsing a markup-language based user interface, received from the first DNS server, to derive the first set of DNS records.

11. A non-transitory computer storage medium storing executable code, wherein the executable code configures a computing system to perform a process comprising:

subscribing to notifications from a first domain name system ("DNS") server;

receiving, from the first DNS server, a notification that a first DNS record for a domain has changed, wherein the first DNS record maps a resource associated with the domain to a network address of the resource, and wherein the notification is received based at least partly on subscribing to the notifications from the first DNS server;

retrieving, from the first DNS server, a first set of DNS records for the domain, wherein the first set of DNS records are retrieved in a first server-specific format associated with the first DNS server, and wherein the first set of DNS records comprises the first DNS record that has been changed;

determining a first transformation set associated with the first DNS server, wherein the first transformation set comprises one or more transformations to be applied to the first set of DNS records to generate a second set of DNS records in a DNS server-independent format;

generating the second set of DNS records in the DNS server-independent format using the first set of DNS records and the first transformation set, wherein a second DNS record in the DNS server-independent format is generated based at least partly on the first transformation set using a formatting alteration applied to a third DNS record in the first server-specific format;

determining, based at least partly on (1) an association of the domain with a second DNS server and (2) the notification from the first DNS server, to update domain-specific data at the second DNS server;

determining a second transformation set associated with the second DNS server, wherein the second transformation set comprises one or more transformations to be applied to the second set of DNS records to generate a third set of DNS records in a second server-specific format associated with the second DNS server;

generating the third set of DNS records using the second set of DNS records and the second transformation set; and updating the domain-specific data at the second DNS server using the third set of DNS records.

12. The non-transitory computer storage medium of claim 11, wherein generating the second set of DNS records comprises excluding a fourth DNS record of the first set of DNS records such that the second set of DNS records does not include any DNS record corresponding to the fourth DNS record.

13. The non-transitory computer storage medium of claim 11, wherein generating the second set of DNS records comprises generating, based at least partly on the first transformation set, a record of the second set of DNS records using a combination of data from a record of the first set of DNS records and data from a data source separate from the first DNS server.

14. The non-transitory computer storage medium of claim 11, wherein generating the second set of DNS records comprises generating, based at least partly on the first transformation set, a fourth DNS record of a first DNS record type using a fifth DNS record of a second DNS record type from the first set of DNS records.

* * * * *

UNITED STATES PATENT AND TRADEMARK OFFICE
CERTIFICATE OF CORRECTION

| | |
|---|---|
| PATENT NO. | : 11,228,559 B2 |
| APPLICATION NO. | : 16/926253 |
| DATED | : January 18, 2022 |
| INVENTOR(S) | : Albert |

It is certified that error appears in the above-identified patent and that said Letters Patent is hereby corrected as shown below:

In the Claims

Column 16, Line 56, Claim 8, delete "fourth" and insert --first--.

Signed and Sealed this
Nineteenth Day of April, 2022

Katherine Kelly Vidal
*Director of the United States Patent and Trademark Office*